(12) United States Patent
Gu

(10) Patent No.: US 8,958,032 B2
(45) Date of Patent: Feb. 17, 2015

(54) LCD PANEL, AND MANUFACTURING METHOD AND DRIVING METHOD THEREOF

(75) Inventor: Haobo Gu, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 401 days.

(21) Appl. No.: 13/375,336

(22) PCT Filed: Jun. 10, 2011

(86) PCT No.: PCT/CN2011/075623
§ 371 (c)(1),
(2), (4) Date: Nov. 30, 2011

(87) PCT Pub. No.: WO2012/155374
PCT Pub. Date: Nov. 22, 2012

(65) Prior Publication Data
US 2012/0293741 A1    Nov. 22, 2012

(30) Foreign Application Priority Data
May 17, 2011    (CN) .......................... 2011 1 0127727

(51) Int. Cl.
*G02F 1/1347* (2006.01)
*G02F 1/1335* (2006.01)
*G09G 3/36* (2006.01)
*G02F 1/1362* (2006.01)

(52) U.S. Cl.
CPC .............. *G02F 1/13471* (2013.01); *G09G 3/36* (2013.01); *G02F 1/133516* (2013.01); *G02F 2001/136222* (2013.01); *G09G 2300/0426* (2013.01); *G09G2300/0452* (2013.01); *G09G 2300/0465* (2013.01)
USPC ................ 349/74; 349/77; 349/106; 349/158

(Continued)

(58) Field of Classification Search
CPC . G09G 3/3611; G09G 3/36; G09G 2300/023; G09G 2330/08; G09G 3/3607; G02F 1/133; G02F 1/1333; G02F 1/1347; G02F 1/13471; G02F 2001/136222
USPC ........ 349/74, 77–83, 106, 143, 187; 345/4, 5, 345/87–89, 92; 445/25
See application file for complete search history.

(56) References Cited

U.S. PATENT DOCUMENTS 5,300,928 A * 4/1994 Yamazaki ........................ 345/88
6,184,951 B1 * 2/2001 Harrold et al. ................... 349/74

(Continued)

FOREIGN PATENT DOCUMENTS

| CN | 101065705 A | 10/2007 |
|---|---|---|
| CN | 101635263 A | 1/2010 |
| WO | 2005/052863 A2 | 6/2005 |

*Primary Examiner* — Dung Nguyen
*Assistant Examiner* — Tai Duong
(74) *Attorney, Agent, or Firm* — Cheng-Ju Chiang

(57) ABSTRACT

A liquid crystal display (LCD) panel, and a manufacturing method and a driving method thereof are disclosed. The LCD panel comprises: a first pixel matrix comprising a plurality of first pixel units; a second pixel matrix comprising a plurality of second pixel units; and a driving unit, being connected to the first pixel matrix and the second pixel matrix to drive the first pixel matrix and the second pixel matrix respectively, wherein the first pixel matrix and the second pixel matrix are arranged in parallel, and at least a pair of the first pixel units and the second pixel units are partially overlapped with each other to form an overlapped pixel region. In this way, the present invention can provide a high resolution and improve the product yield with the process conditions remaining unchanged.

12 Claims, 5 Drawing Sheets

(56) References Cited

U.S. PATENT DOCUMENTS

| | | |
|---|---|---|
| 2004/0160540 A1 | 8/2004 | Hirakata et al. |
| 2008/0001849 A1* | 1/2008 | Jin et al. .................... 345/4 |
| 2009/0146933 A1* | 6/2009 | Visser et al. ............... 345/87 |
| 2009/0147186 A1* | 6/2009 | Nakai et al. ................ 349/74 |
| 2010/0271346 A1* | 10/2010 | Ku et al. .................... 345/204 |

\* cited by examiner

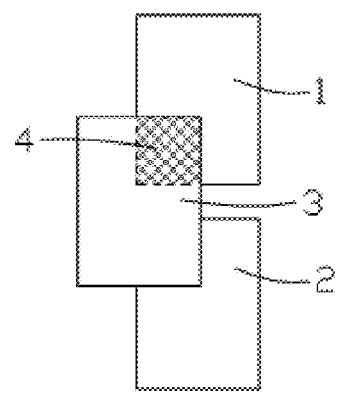
FIG. 5
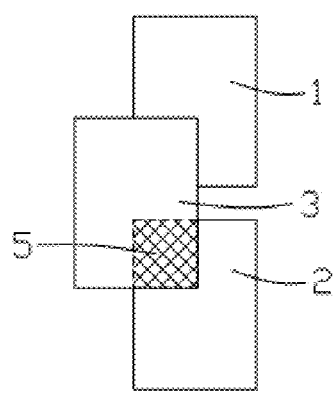
FIG. 6
| R | G | B | R | G | B |
|---|---|---|---|---|---|
| R | G | B | R | G | B |
| R | G | B | R | G | B |
FIG. 7

LCD PANEL, AND MANUFACTURING METHOD AND DRIVING METHOD THEREOF

TECHNICAL FIELD

The present invention generally relates to the field of displaying technologies, and more particularly, to a liquid crystal display (LCD) panel, and a manufacturing method and a driving method thereof.

BACKGROUND

Fineness of pictures displayed by prior art liquid crystal displays (LCDs) is determined by the pixel pitch. For example, 15-inch LCDs with a resolution of 1024×768 all have a pixel pitch of 0.297 mm or 0.30 mm, and 17-inch LCDs generally all have a pixel pitch of 0.264 mm. For mainstream mobile phone products currently available, the pixel pitch may even be as small as 0.1 mm and below, so they are able to display a very fine and realistic picture.

However, the too small pixel pitch also leads to associated problems in the production. For example, this leads to too high requirements on the exposure precision, and also makes the electrode wirings very thin to cause poor current signals, thus causing a too low yield of the highly fine liquid crystal panels. Seriousness of this problem has been proven by a practical case: because the highly fine display panels equipped in a type of mobile phones have a too low yield, this type of mobile phones is short of supply and it is very difficult to purchase such a mobile phone in the market.

As shown in FIG. 1, a schematic cross-sectional view of an LCD panel in the prior art is shown therein. In the prior art, the exposure precision of the pixel matrix manufacturing process has been very close to the limit, and increasing the resolution to a great extent with other process requirements remaining unchanged will have a serious effect on the yield.

The present inventor has noticed that, an advanced manufacturing technology for LCDs, which is termed as the color-filter-on-array (COA) technology, has come into use in the market. According to the COA technology, a color filter is formed on a thin film transistor (TFT) substrate; and the main advantage thereof is that the pixel aperture ratio and the displaying quality of the LCD can be improved, so it can be applied to high-level products. Furthermore, because it obviates the problem of alignment between the glass substrate of the color filter and the TFT substrate, the CELL process can be made easier.

For the COA technology, reference may be made to China Patent Application No. 02140119.5 published on Dec. 18, 2002, which discloses an electrode substrate for use in an LCD. According to this application, an array substrate comprises signal lines and control lines orthogonal to and on top of each other on a glass substrate. Near intersections between the signal lines and the control lines are disposed a plurality of TFTs. On the glass substrate, a color filter layer and pixel electrodes are stacked in sequence corresponding to the pixel regions surrounded by the signal lines and the control lines, and a strip-like colored region is formed by the pixel electrodes and the color filter layer.

SUMMARY OF THE INVENTION

The primary objective of the present invention is to provide a liquid crystal display (LCD) panel, and a manufacturing method and a driving method thereof, which can lead to a significantly improved product yield while a small pixel pitch is achieved.

To achieve this objective, an embodiment of the present invention provides a liquid crystal display (LCD) panel, which comprises: a first pixel matrix comprising a plurality of first pixel units; a second pixel matrix comprising a plurality of second pixel units; and a driving unit, being connected to the first pixel matrix and the second pixel matrix to drive the first pixel matrix and the second pixel matrix respectively, wherein, the first pixel matrix and the second pixel matrix are arranged in parallel, and are spaced from each other by a substrate sandwiched between two liquid crystal layers, and at least a pair of the first pixel units and the second pixel units are partially overlapped with each other to form an overlapped pixel region; the first pixel units and the second pixel units are overlapped in a row direction or in a column direction of the first pixel matrix; and the first pixel matrix is arranged above the second pixel matrix, a length of the first pixel matrix is greater than that of the second pixel matrix, and the overlapped pixel region is rectangular.

In the LCD panel, the first pixel units and the second pixel units each comprise a red sub-pixel, a green sub-pixel and a blue sub-pixel, and the red sub-pixels, the green sub-pixels and the red sub-pixels are linearly arranged.

In the LCD panel, the LCD panel comprises a first substrate, a second substrate and a third substrate disposed in sequence from top to bottom, the first pixel matrix is formed between the first substrate and the second substrate, and the second pixel matrix is formed between the second substrate and the third substrate.

In the LCD panel, first thin film transistor (TFT) units corresponding to the first pixel units are disposed on the first substrate; first color filter units corresponding to the first pixel units are disposed on the second substrate; and the third substrate has second TFT units and second color filter units disposed thereon, and both the second TFT units and the second color filter units are disposed corresponding to the second pixel units.

In the LCD panel, the first substrate or the second substrate is provided with the first TFT units corresponding to the first pixel units; the third substrate has the second TFT units and the second color filter units disposed thereon, and both the second TFT units and the second color filter units are disposed corresponding to the second pixel units.

To achieve the aforesaid objective, an embodiment of the present invention provides an LCD panel, which comprises: a first pixel matrix comprising a plurality of first pixel units; a second pixel matrix comprising a plurality of second pixel units; and a driving unit, being connected to the first pixel matrix and the second pixel matrix to drive the first pixel matrix and the second pixel matrix respectively, wherein, the first pixel matrix and the second pixel matrix are arranged in parallel, and are spaced from each other by a substrate sandwiched between two liquid crystal layers, and at least a pair of the first pixel units and the second pixel units are partially overlapped with each other to form an overlapped pixel region; and the first pixel matrix is arranged above the second pixel matrix, a length of the first matrix is greater than that of the second pixel matrix, and the overlapped pixel region is rectangular.

In the LCD panel, the first pixel units and the second pixel units are overlapped in a row direction or in a column direction of the first pixel matrix.

In the LCD panel, the first pixel units and the second pixel units each comprise a red sub-pixel, a green sub-pixel and a blue sub-pixel, and the red sub-pixels, the green sub-pixels and the red sub-pixels are linearly arranged.

In the LCD panel, the LCD panel comprises a first substrate, a second substrate and a third substrate disposed in sequence from top to bottom, the first pixel matrix is formed between the first substrate and the second substrate, and the second pixel matrix is formed between the second substrate and the third substrate.

In the LCD panel, first thin film transistor (TFT) units corresponding to the first pixel units are disposed on the first substrate; first color filter units corresponding to the first pixel units are disposed on the second substrate; and the third substrate has second TFT units and second color filter units disposed thereon, and both the second TFT units and the second color filter units are disposed corresponding to the second pixel units.

In the LCD panel, the first substrate or the second substrate is provided with the first TFT units corresponding to the first pixel units; the third substrate has the second TFT units and the second color filter units disposed thereon, and both the second TFT units and the second color filter units are disposed corresponding to the second pixel units.

To achieve the aforesaid objective, an embodiment of the present invention provides a manufacturing method for an LCD panel, comprising: preparing a first substrate, a second substrate and a third substrate; and disposing the first substrate and the second substrate to be spaced apart from each other in the vertical direction, and filling and sealing a liquid crystal material therebetween to form a first pixel matrix between the first substrate and the second substrate; disposing a third substrate to be spaced apart from the second substrate in the vertical direction, and filling and sealing the liquid crystal material therebetween to form a second pixel matrix between the second substrate and the third substrate; wherein, the first pixel matrix comprises a plurality of first pixel units, the second pixel matrix comprises a plurality of second pixel units disposed corresponding to the first pixel units, the first and second pixel units are spaced from each other by a substrate sandwiched between two liquid crystal layers, and an overlapped pixel region is formed between at least a pair of the first pixel units and the second pixel units; and the first pixel matrix is arranged above the second pixel matrix, a length of the first pixel matrix is greater than that of the second pixel matrix, and the overlapped pixel region is rectangular.

The present invention has the following benefits: as compared to the prior art LCD panels where a high resolution and a high product yield cannot be achieved at the same time, the present invention employs two layers of pixels superimposed on each other to display an image; i.e., first pixel units and second pixel units are disposed in separate layers to form overlapped pixel regions for displaying purpose. Because different portions of the overlapped pixel regions can be separately controlled and a pitch between adjacent overlapped pixel regions may be made to be smaller than a pixel pitch between adjacent first pixel units and a pixel pitch between adjacent second pixel units, the resolution is remarkably increased; meanwhile, instead of having to be formed at a high precision which would cause a low product yield, the first pixel units and the second pixel units may be formed through an existing process at a normal precision, so the product yield gets improved. Thereby, the LCD panel of the present invention can lead to a significantly improved product yield while a small pixel pitch is achieved.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

FIG. 5 is a view illustrating a second operation state of the third embodiment of the LCD panel according to the present invention.

FIG. 6 is a view illustrating a third operation state of the third embodiment of the LCD panel according to the present invention.

FIG. 7 is a view illustrating arrangement of pixel units in the third embodiment of the LCD panel according to the present invention.

DETAILED DESCRIPTION OF EMBODIMENTS

Reference will now be made to the drawings to describe preferred and exemplary embodiments of the present invention in detail.

Figure 1:
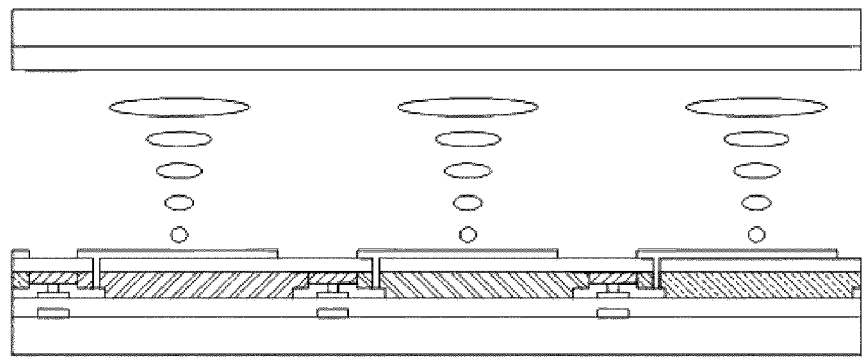
FIG. 1 is a schematic cross-sectional view of an LCD panel in the prior art.
Figure 2:
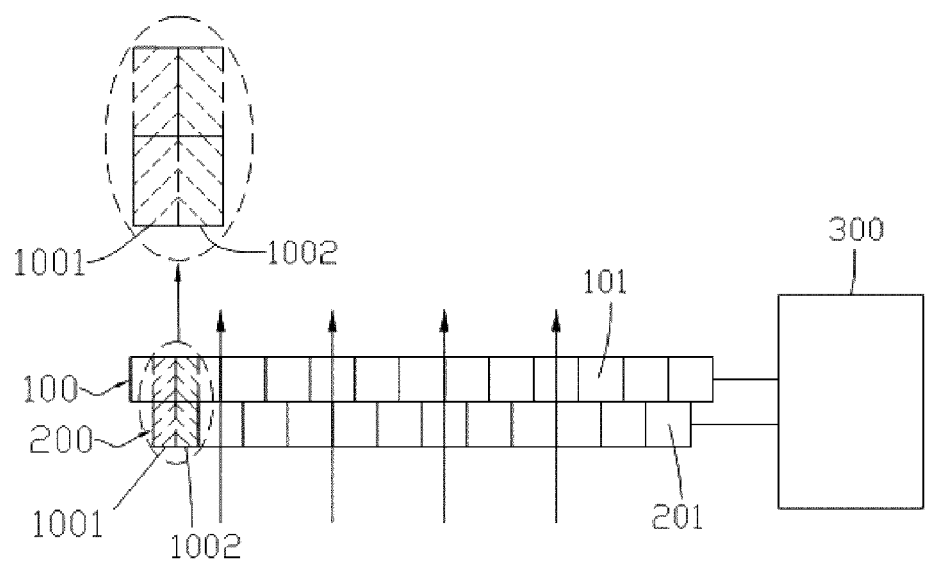
FIG. 2 is a view illustrating principles of a first embodiment of an LCD panel according to the present invention.

FIG. 2 is a view illustrating principles of a first embodiment of an LCD panel according to the present invention. The LCD panel comprises a first pixel matrix 100, a second pixel matrix 200 and a driving unit 300. The first pixel matrix 100 comprises a plurality of first pixel units 101, and the second pixel matrix 200 comprises a plurality of second pixel units 201. The driving unit 300 is connected to the first pixel matrix 100 and the second pixel matrix 200 to drive the first pixel matrix 100 and the second pixel matrix 200 respectively.

The first pixel matrix 100 and the second pixel matrix 200 are disposed in parallel, with at least one pair of a first pixel unit 101 and a second pixel unit 201 being partially overlapped with each other to form a first overlapped pixel region 1001. For example, a first overlapped pixel region 1001 is formed by a pair of a first pixel unit 101 and a second pixel unit 201, and a second overlapped pixel region 1002 is formed by a pair of the first pixel unit 101 and another second pixel unit 201. As shown in FIG. 2, the first pixel matrix 100 is arranged above the second pixel matrix 200, a length of the first pixel matrix 100 is greater than that of the second pixel matrix 200, and the overlapped pixel region (such as the first overlapped pixel region 1001 and/or the second overlapped pixel region 1002) is rectangular.

This embodiment of the present invention has two layers of pixels superimposed on each other to display a picture; i.e., the first pixel units 101 and the second pixel units 201 are disposed in separate layers to form overlapped pixel regions.

Because the first overlapped pixel region 1001 and the second overlapped pixel region 1002 can be separately controlled for displaying purpose, the displaying resolution is increased; meanwhile, instead of having to be formed at a high precision which would cause a low product yield, the first pixel units 101 and the second pixel units 201 may be formed through an existing process at a normal precision, so the product yield gets improved. Thereby, the LCD panel of the present invention leads to a significantly improved product yield while a small pixel pitch is achieved.

Figure 3:
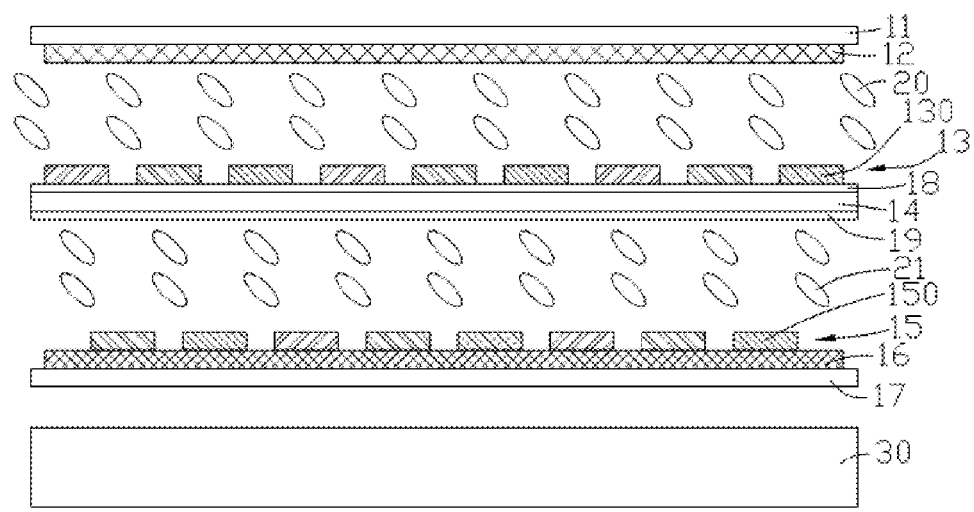
FIG. 3 is a schematic view illustrating a structure of a second embodiment of the LCD panel according to the present invention.

Referring to FIG. 2 and FIG. 3 together, FIG. 3 is a schematic view illustrating a structure of a second embodiment of the LCD panel according to the present invention. The LCD panel comprises a first substrate 11, a second substrate 14 and a third substrate 17 disposed in sequence from top to bottom. The first pixel matrix 100 is formed between the first substrate 11 and the second substrate 14, and the second pixel matrix 200 is formed between the second substrate 14 and the third substrate 17. In this embodiment, three substrates 11, 14, 17 are used to form separate layers of pixel matrices, so the structure is relatively simple.

It shall be appreciated that, the structure for forming separate layers of pixel matrices is not limited to this; for example, a structure in which four substrates are arranged in sequence from top to bottom may be adopted, with a layer of pixel matrix being formed between every two adjacent substrates.

Referring also to FIG. 2 and FIG. 3, in a third embodiment of the LCD panel of the present invention, on a surface of the first substrate 11 that faces towards the second substrate 14 is disposed a first TFT layer 12, which comprises a plurality of first TFT units (not shown) in one-to-one correspondence with the first pixel units 101, and on a surface of the second substrate 14 that faces towards the first substrate 11 is disposed a first common electrode 18. On a surface of the first common electrode 18 that faces towards the first substrate 11 is disposed a first color filter 13 corresponding to the first TFT layer 12. The first color filter 13 comprises a plurality of first color filter units 130 disposed corresponding to the first pixel units 101. A first liquid crystal layer 20 is disposed between the first TFT layer 12 and the first color filter 13. The third substrate 17 is a substrate adopting a COA technology. On a surface of the third substrate 17 that faces towards the second substrate 14 is disposed a second TFT layer 16, which comprises a plurality of second TFT units (not shown) in one-to-one correspondence with the second pixel units 201. On a surface of the second TFT layer 16 that faces towards the second substrate 14 is disposed a second color filter 15, which comprises a plurality of second color filter units 150 disposed corresponding to the second pixel units 150. Meanwhile, a second common electrode 19 is disposed on a surface of the second substrate 14 that faces towards the third substrate 17, and a second liquid crystal layer 21 is disposed between the second color filter 15 and the second common electrode 19. Of course, a backlight module 30 may also be disposed at an outer side the third substrate 17.

The embodiment described above is implemented in the following way: a second TFT layer 16 and a second color filter 15 are disposed on a third substrate 17, then a second substrate 14 having a first color filter 13 disposed thereon is formed, and finally, a first substrate 11 having a first TFT layer 12 disposed thereon is formed. That is, the first pixel matrix 100 consisted of the first pixel units 101 and the second pixel matrix 200 consisted of the second pixel units 201 are spaced from each other by the second substrate 14 sandwiched between the two liquid crystal layers 20 and 21. The two pixel layers corresponding to the first TFT layer 12 and the second TFT layer 16 respectively are arranged to be overlapped with each other to form overlapped pixel regions. Thus, with the upper and the lower pixels in the overlapped pixel region being turned on, the gray scale of the overlapped pixel region can be adjusted. Furthermore, a pitch between two adjacent overlapped pixel regions in the left-and-right direction can be made to be smaller than a pitch between the first pixel units 101 or between the second pixel units 201, so a finer picture with a better coloring effect can be displayed.

Figure 4:
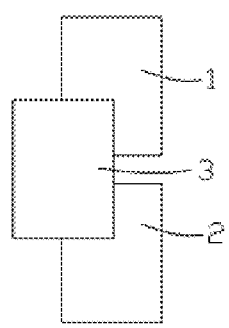
FIG. 4 is a view illustrating a first operation state of a third embodiment of the LCD panel according to the present invention.

An operation process corresponding to this embodiment is shown in FIGS. 4 to 6. Hereinafter, an example in which both the first pixel unit 101 and the second pixel unit 201 comprise a first sub-pixel, a second sub-pixel and a third sub-pixel will be described with reference to FIGS. 3 to 6.

1) Referring to FIG. 4, there is shown a view illustrating a first operation state of a third embodiment of the LCD panel according to the present invention. When the backlight module 30 lights up, the second TFT layer 16 of the third substrate 17 is firstly turned on, and a gray scale is presented by the first sub-pixel 1 on the third substrate 17. However, because the first TFT layer 12 of the first substrate 11 is at an "Off" state, no light passes through the LCD panel and, therefore, no image is displayed.

2) Referring to FIG. 5, there is shown a view illustrating a second operation state of the third embodiment of the LCD panel according to the present invention. Only when the first TFT layer 12 of the first substrate 11 is turned on, can the whole LCD panel displays an image; and only the overlapped pixel region 4 formed by the third substrate 17, the first substrate 11 and the second substrate 14 can display a gray scale.

3) Referring to FIG. 6, there is shown a view illustrating a third operation state of the third embodiment of the LCD panel according to the present invention. When it is desired to display a next row of pixels, a part, that corresponds to the first sub-pixel 1, of the second TFT layer 16 on the third substrate 17 is firstly turned off to turn off the overlapped pixel region 4 that is originally turned on; and then a part, that corresponds to the second sub-pixel 2, of the second TFT layer 16 on the third substrate 17 is turned on to turn on the overlapped pixel region 5.

Referring to FIG. 5 and FIG. 6 together, because the pitch between the adjacent overlapped pixel regions 4 and 5 may be made to be smaller than a pixel pitch between adjacent first pixel units 101 or a pixel pitch between adjacent second pixel units 201, a picture finer than what is conventionally obtained can be displayed, thus increasing the resolution significantly. Positions of the first pixel matrix 100 and the second pixel matrix 200 may be arranged depending on practical needs, and the overlapped pixel region 4 or the overlapped pixel region 5 may be made to be even smaller to further increase the fineness of the displayed picture.

According to the aforesaid displaying principles, the overlapped pixel regions can be scanned row by row to display a picture finer than what can be conventionally obtained.

In the embodiment of the present invention, both the pixel aperture ratio and the displaying quality of the LCD are improved by forming the second color filter 15 on the second TFT layer 16. Furthermore, because this manufacturing process obviates the problem of alignment between the color filter and the TFT layer, the CELL process can be made easier.

Because the COA technology is adopted in this embodiment, a high aperture ratio is achieved and, meanwhile, the manufacturing process is made easier. However, it shall be appreciated that, the COA technology may also not be adopted (i.e., the TFTs and the color filter may also not be formed on a same substrate). Furthermore, other embodiments may also exist even when the COA technology is adopted, for example, embodiments in which the COA technology is adopted not only in the third substrate 17 but also in the first substrate 11.

In various embodiments of the present invention, a ratio of a pitch between adjacent overlapped pixel regions (e.g., the pitch between the first overlapped pixel region 1001 and the second overlapped pixel region 1002 formed by the first pixel units 101 and the second pixel units 201) to a pitch between adjacent first pixel units 101 or to a pitch between adjacent second pixel units 201 is 0.3~0.7 (e.g., 0.3, 0.4, 0.5, 0.6 or 0.7).

In the aforesaid embodiment, by adjusting the pitch between the first overlapped pixel region 1001 and the second overlapped pixel region 1002, a magnitude of the luminous flux can be adjusted to allow for free adjustment in fineness of pictures displayed by the LCD panel.

Referring to FIG. 7 and FIG. 2 together, FIG. 7 is a view illustrating arrangement of pixel units in the third embodiment of the LCD panel according to the present invention. The first pixel units 101 and the second pixel units 201 each comprise a red sub-pixel, a green sub-pixel and a blue sub-pixel, and the red sub-pixels, the green sub-pixels and the blue sub-pixels are linearly arranged (i.e., sub-pixels of a same color are linearly arranged in the lateral direction or in the longitudinal direction).

In various embodiments of the present invention, the first pixel units 101 and the second pixel units 201 may be arranged depending on practical needs. For example, the first pixel units 101 and the second pixel units 201 may be arranged to be overlapped in a row direction or in a column direction. Of course, the first pixel units 101 and the second pixel units 201 may also be overlapped in other directions oblique to the row direction, which will not be further described herein.

Figure 8:
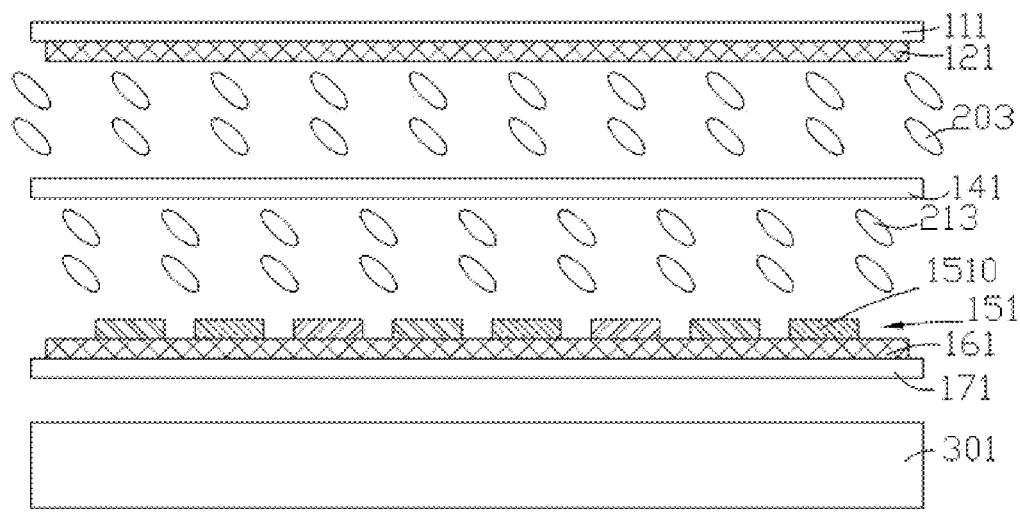
FIG. 8 is a schematic view illustrating a structure of a fourth embodiment of the LCD panel according to the present invention.

To obtain a brighter color, a single-color-filter structure may be adopted in an embodiment of the present invention; i.e., only one of the substrates is provided with a color filter. For example, referring to FIG. 8 and FIG. 2 together, FIG. 8 is a schematic view illustrating a structure of a fourth embodiment of the LCD panel according to the present invention. The fourth embodiment differs from the second embodiment in that: on a surface of the first substrate 111 that faces towards the second substrate 141 is disposed a first TFT layer 121, which comprises a plurality of first TFT units (not shown) in one-to-one correspondence with the first pixel units 101; and a first liquid crystal layer 203 is disposed between the first TFT layer 121 and the second substrate 141. The third substrate 171 is a substrate adopting the COA technology, and on a surface of the third substrate 171 that faces towards the second substrate 141 is disposed a second TFT layer 161, which comprises a plurality of second TFT units (not shown) in one-to-one correspondence with the second pixel units 201. On a surface of the second TFT layer 161 that faces towards the second substrate 141 is disposed a color filter 151, which comprises a plurality of color filter units 1510 disposed corresponding to the second pixel units 201. Meanwhile, a second liquid crystal layer 213 is disposed between the second substrate 141 and the color filter 151. Of course, a backlight module 301 may also be disposed at an outer side of the third substrate 171. Additionally, the first TFT layer 121 may also be disposed on a surface of the second substrate 141 that faces towards the first substrate 111 depending on practical needs.

As described above, by providing only a single color filter layer 151 in this embodiment, the luminous flux can be increased to enhance the luminance of the LCD panel.

Figure 9:
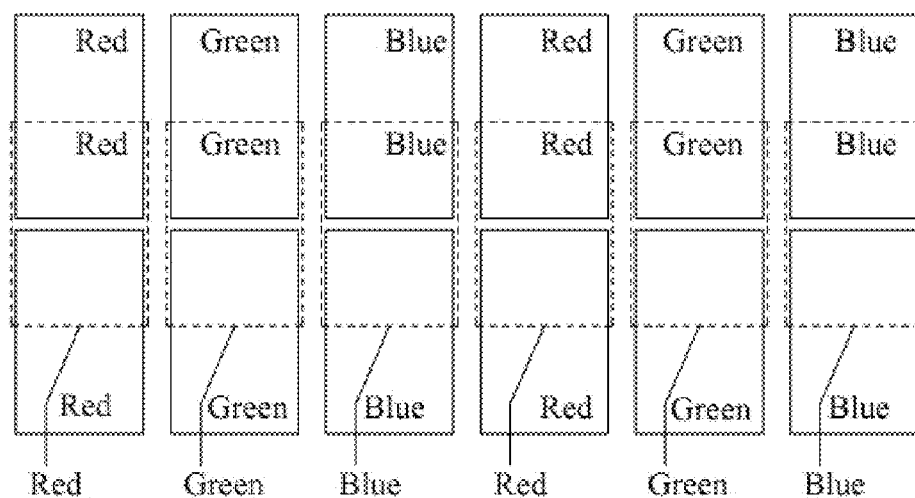
FIG. 9 is a schematic view illustrating a first embodiment of a composite structure formed by the first and the second pixel units in the LCD panel according to the present invention.
Figure 10:
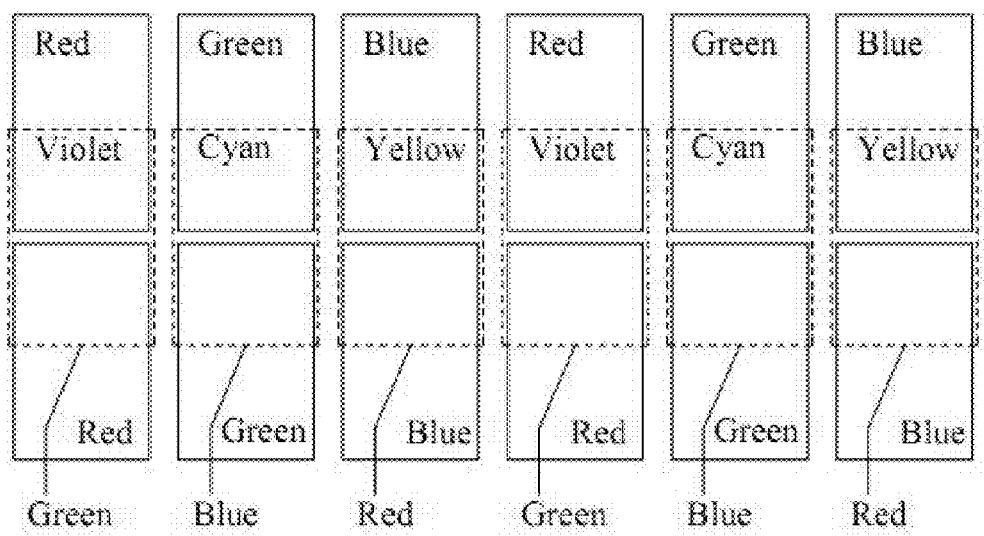
FIG. 10 is a schematic view illustrating a second embodiment of the composite structure formed by the first and the second pixel units in the LCD panel according to the present invention.

FIG. 9 and FIG. 10 are schematic views illustrating a first embodiment and a second embodiment of a composite structure formed by the first and the second pixel units in the LCD panel according to the present invention respectively. Referring to FIGS. 9 and 10 in conjunction with FIGS. 2 and 3, light of a desired color may be obtained through additive color mixture of colors of the first pixel units 101 and the second pixel units 201. Through superimposition of the three primary colors (i.e., the red color (R), the green color (G) and the blue color (B)), a yellow color (Y), a magenta color (M) and a cyan color (C) can be obtained; and if the three primary colors are fully superimposed, a white color will be obtained. If both the first pixel units 101 and the second pixel units 201 use a color filter for bi-directional color mixture, a color of a better hue and a better purity will be obtained.

As shown in FIG. 9, the red sub-pixels, the green sub-pixels and the blue sub-pixels arranged in sequence on the second color filter 15 are overlapped with the red sub-pixels, the green sub-pixels and the blue sub-pixels arranged in sequence on the first color filter 13 to form pixels which still present the red color, the green color and the blue color respectively. In this case, the second color filter 15 and the first color filter 13 are overlapped in a simple way, for example, with the red sub-pixels corresponding to each other, the green sub-pixels corresponding to each other and the blue sub-pixels corresponding to each other; this way of overlapping only allows for division of pixels but does not allow for color mixing. In another example, as shown in FIG. 10, the red sub-pixels, the green sub-pixels and the blue sub-pixels arranged in sequence on the second color filter 15 are overlapped with the green sub-pixels, the blue sub-pixels and the red sub-pixels arranged in sequence on the first color filter 13 to form pixels which present a violet color, a cyan color and a yellow color respectively.

In the aforesaid embodiment, by arranging the red, the green and the blue sub-pixels in different ways, the first pixel units 101 and the second pixel units 201 can be overlapped in different ways to result in different display properties suitable for different applications.

In light of the spirits of the present invention, a driving method for an LCD panel according to an embodiment of the present invention is also provided. Referring back to FIGS. 2 and 3, with the first overlapped pixel region 1001 as an example, the driving method comprises the following steps:

Step I: In a process of displaying a bright pixel, a control signal is outputted to permit the second pixel unit 201 formed between the second substrate 14 and the third substrate 17 to transmit light and to permit the first pixel unit 101 formed between the first substrate 11 and the second substrate 14 to transmit a part of the light from the second pixel unit 201 so that the first overlapped pixel region 1001 formed between the second pixel unit 201 and the first pixel unit 101 transmits light. In a process of displaying a dark pixel, a control signal is outputted to inhibit the first pixel unit 101 and the second pixel unit 201 from transmitting light.

Step II: the step of outputting a control signal to control transmission of light through the first overlapped pixel region 1001 is repeated until operations of displaying a bright pixel or a dark pixel have been completed on all the first overlapped pixel regions 1001 formed by the second pixel units 201 between the second substrate 14 and the third substrate 17 as well as the first pixel units 101 between the first substrate 11 and the second substrate 14.

In the embodiment of the present invention, by outputting a control signal to control the second pixel unit 201 to transmit the light or not and to control the first pixel unit 101 to transmit light or not, a bright pixel or a dark pixel can be displayed by the first overlapped pixel region 1001.

Also in light of the spirits of the present invention, a first embodiment of a manufacturing method for an LCD panel according to the present invention is provided, which comprises the following steps:

(1) preparing a first substrate, a second substrate and a third substrate; and (2) disposing the first substrate and the second substrate to be spaced apart from each other in the vertical direction, and filling and sealing a liquid crystal material therebetween to form a first pixel matrix between the first substrate and the second substrate; disposing a third substrate to be spaced apart from the second substrate in the vertical direction, and filling and sealing the liquid crystal material therebetween to form a second pixel matrix between the second substrate and the third substrate;

wherein, the first pixel matrix comprises a plurality of first pixel units, the second pixel matrix comprises a plurality of second pixel units disposed corresponding to the first pixel units, and an overlapped pixel region is formed between at least a pair of the first pixel units and the second pixel units.

In the embodiment of the present invention, by filling and sealing the liquid crystal material between the first substrate, the second substrate and the third substrate to form overlapped pixel regions, fineness of pictures displayed by the LCD panel can be improved.

In an embodiment of the method described above, the first substrate is formed through a TFT process, the second substrate is formed through a color filter process, and the third substrate is formed by a COA technology.

For example, in a process of manufacturing the LCD panel, the first substrate is formed through a TFT process, and the second substrate is formed through a color filter process. Afterwards, through a liquid crystal injection process or a one drop fill (ODF) process, the first substrate and the second substrate are sealingly coated, then subjected to the ODF process and a vacuum lamination process, and then cured through UV irradiation. The third substrate is sealingly coated and subjected to the ODF process, and is vacuum laminated onto the first and the second substrates that have been laminated together. Then, the first, the second and the third substrates laminated together are cured through UV irradiation and the sealant is thermally cured to form a complete LCD panel.

In the embodiment of the present invention, by flexibly using different processes in combination, a complete LCD panel can be fabricated through a simple manufacturing process and at a high product yield.

According to the aforesaid embodiment, by providing an additional CELL process in the original LCD manufacturing process, an LCD having a high pixel fineness can be produced. This significantly improves the resolution of the LCD panel and also increases the product yield.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
a first pixel matrix comprising a plurality of first pixel units;
a second pixel matrix comprising a plurality of second pixel units; and
a driving unit, being connected to the first pixel matrix and the second pixel matrix to drive the first pixel matrix and the second pixel matrix respectively;
wherein, the first pixel matrix and the second pixel matrix are arranged in parallel, and are spaced from each other by a substrate sandwiched between two liquid crystal layers, and at least a pair of the first pixel units and the second pixel units are partially overlapped with each other to form an overlapped pixel region;
the first pixel units and the second pixel units are overlapped in a row direction or in a column direction of the first pixel matrix; and
the first pixel matrix is arranged above the second pixel matrix, a length of the first pixel matrix is greater than that of the second pixel matrix, and the overlapped pixel region is rectangular.

2. The LCD panel of claim 1, wherein:
the first pixel units and the second pixel units each comprise a red sub-pixel, a green sub-pixel and a blue sub-pixel, and the red sub-pixels, the green sub-pixels and the blue sub-pixels are linearly arranged.

3. The LCD panel of claim 1, wherein:
the LCD panel comprises a first substrate, a second substrate and a third substrate disposed in sequence from top to bottom, the first pixel matrix is formed between the first substrate and the second substrate, and the second pixel matrix is formed between the second substrate and the third substrate.

4. The LCD panel of claim 3, wherein:
first thin film transistor (TFT) units corresponding to the first pixel units are disposed on the first substrate;
first color filter units corresponding to the first pixel units are disposed on the second substrate; and
the third substrate has second TFT units and second color filter units disposed thereon, and both the second TFT units and the second color filter units are disposed corresponding to the second pixel units.

5. The LCD panel of claim 3, wherein:
the first substrate or the second substrate is provided with the first TFT units corresponding to the first pixel units; and
the third substrate has the second TFT units and the second color filter units disposed thereon, and both the second TFT units and the second color filter units are disposed corresponding to the second pixel units.

6. A liquid crystal display (LCD) panel, comprising:
a first pixel matrix comprising a plurality of first pixel units;
a second pixel matrix comprising a plurality of second pixel units; and
a driving unit, being connected to the first pixel matrix and the second pixel matrix to drive the first pixel matrix and the second pixel matrix respectively;
wherein, the first pixel matrix and the second pixel matrix are arranged in parallel, and are spaced from each other by a substrate sandwiched between two liquid crystal layers, and at least a pair of the first pixel units and the second pixel units are partially overlapped with each other to form an overlapped pixel region; and
the first pixel matrix is arranged above the second pixel matrix, a length of the first pixel matrix is greater than that of the second pixel matrix, and the overlapped pixel region is rectangular.

7. The LCD panel of claim 6, wherein:
the first pixel units and the second pixel units are overlapped in a row direction or in a column direction of the first pixel matrix.

8. The LCD panel of claim 6, wherein:
the first pixel units and the second pixel units each comprise a red sub-pixel, a green sub-pixel and a blue sub-pixel, and the red sub-pixels, the green sub-pixels and the blue sub-pixels are linearly arranged.

9. The LCD panel of claim 6, wherein:
the LCD panel comprises a first substrate, a second substrate and a third substrate disposed in sequence from top to bottom, the first pixel matrix is formed between the first substrate and the second substrate, and the second pixel matrix is formed between the second substrate and the third substrate.

10. The LCD panel of claim 9, wherein:
first thin film transistor (TFT) units corresponding to the first pixel units are disposed on the first substrate;
first color filter units corresponding to the first pixel units are disposed on the second substrate; and
the third substrate has second TFT units and second color filter units disposed thereon, and both the second TFT units and the second color filter units are disposed corresponding to the second pixel units.

11. The LCD panel of claim 9, wherein:
the first substrate or the second substrate is provided with the first TFT units corresponding to the first pixel units; and
the third substrate has the second TFT units and the second color filter units disposed thereon, and both the second TFT units and the second color filter units are disposed corresponding to the second pixel units.

12. A manufacturing method for a liquid crystal display (LCD) panel, comprising:
preparing a first substrate, a second substrate and a third substrate; and
disposing the first substrate and the second substrate to be spaced apart from each other in the vertical direction, and filling and sealing a liquid crystal material therebetween to form a first pixel matrix between the first substrate and the second substrate; disposing a third substrate to be spaced apart from the second substrate in the vertical direction, and filling and sealing the liquid crystal material therebetween to form a second pixel matrix between the second substrate and the third substrate;
wherein, the first pixel matrix comprises a plurality of first pixel units, the second pixel matrix comprises a plurality of second pixel units disposed corresponding to the first pixel units, the first and second pixel units are spaced from each other by a substrate sandwiched between two liquid crystal layers, and an overlapped pixel region is formed between at least a pair of the first pixel units and the second pixel units; and
the first pixel matrix is arranged above the second pixel matrix, a length of the first pixel matrix is greater than that of the second pixel matrix, and the overlapped pixel region is rectangular.

\* \* \* \* \*